(12) United States Patent
Vikstrom et al.

(10) Patent No.: US 9,688,164 B2
(45) Date of Patent: Jun. 27, 2017

(54) MOVABLE VEHICLE SEAT WITH MONOPOST

(71) Applicant: Tesla Motors, Inc., Palo Alto, CA (US)

(72) Inventors: P Thomas Vikstrom, Los Altos, CA (US); Tony Paschos, Palo Alto, CA (US); Jan Just, Palo Alto, CA (US); Franz Von Holzhausen, Malibu, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 14/835,448

(22) Filed: Aug. 25, 2015

(65) Prior Publication Data

US 2017/0057380 A1    Mar. 2, 2017

(51) Int. Cl.
*B60N 2/12*    (2006.01)
*B60N 2/02*    (2006.01)
*B60N 2/01*    (2006.01)

(52) U.S. Cl.
CPC ............... *B60N 2/12* (2013.01); *B60N 2/01* (2013.01); *B60N 2/0232* (2013.01); *B60N 2/0292* (2013.01)

(58) Field of Classification Search
CPC . B60N 2/005; B60N 2/04; B60N 2/06; B60N 2/10; B60N 2/12; B60N 2/68
USPC .............. 296/64, 65.01, 65.05, 65.13, 65.15
See application file for complete search history.

(56) References Cited

U.S. PATENT DOCUMENTS

| | | | |
|---|---|---|---|
| 872,247 A * | 11/1907 | Moss | B60N 2/0705 248/416 |
| 2,652,880 A * | 9/1953 | Gundersen | B60N 2/10 248/421 |
| 3,741,513 A | 6/1973 | Wilson | |
| 6,799,805 B2 | 10/2004 | Johnson | |
| 7,731,296 B2 | 6/2010 | Tsuda et al. | |
| 8,002,350 B2 | 8/2011 | Johnson | |
| D673,393 S | 1/2013 | von Holzhausen et al. | |
| 2003/0184112 A1 | 10/2003 | Furui | |
| 2009/0212190 A1 | 8/2009 | Dahlbacka et al. | |
| 2009/0256405 A1 | 10/2009 | Peter et al. | |
| 2011/0109114 A1* | 5/2011 | Kolpasky | B60N 2/01 296/65.13 |
| 2012/0161429 A1 | 6/2012 | Rawlinson et al. | |

(Continued)

FOREIGN PATENT DOCUMENTS

| | | |
|---|---|---|
| DE | 202009009137 | 12/2009 |
| EP | 2322377 | 5/2011 |

OTHER PUBLICATIONS

International Searching Authority; International Search Report and Written Opinion; International Application No. PCT/US2016/048273; Oct. 28, 2016; 9 pgs.

*Primary Examiner* — Jason S Daniels
(74) *Attorney, Agent, or Firm* — Garlick & Markison; Bruce E. Garlick

(57) ABSTRACT

A freestanding vehicle seat assembly includes: a seat having a seat portion connected to a back portion; a monopost attached at a bottom of the seat portion such that the seat rests only on the monopost; and a track assembly attached at a bottom of the monopost, the track assembly configured for providing fore and aft movement of the freestanding vehicle seat assembly. The freestanding vehicle seat assembly can have a pitch mechanism on the monopost configured for pitching at least part of the seat forward and rearward.

16 Claims, 13 Drawing Sheets

(56) References Cited

U.S. PATENT DOCUMENTS

| | | |
|---|---|---|
| 2012/0235006 A1 | 9/2012 | Sailer et al. |
| 2014/0167467 A1* | 6/2014 | Petermann ........... B60N 2/0747 297/344.1 |
| 2015/0145300 A1 | 5/2015 | Finlay et al. |

* cited by examiner

MOVABLE VEHICLE SEAT WITH MONOPOST

BACKGROUND

Vehicles that offer additional seating for adults beyond the four or five seats of a traditional family car are becoming increasingly popular. For example, minivans, cross-overs and sport utility vehicles can provide more seating than a traditional sedan or station wagon. In some vehicle types, the additional seating is furnished by way of a third row of seats positioned behind the regular second-row seats that are traditionally considered the "back" or "rear" seats. However, the third-row seats are typically more difficult to get into and out of because of their placement relative to the vehicle's doors.

SUMMARY

In a first aspect, a freestanding vehicle seat assembly includes: a seat having a seat portion connected to a back portion; a monopost attached at a bottom of the seat portion such that the seat rests only on the monopost; and a track assembly attached at a bottom of the monopost, the track assembly configured for providing fore and aft movement of the freestanding vehicle seat assembly.

Implementations can include any or all of the following features. The freestanding vehicle seat assembly further comprises a pitch mechanism on the monopost configured for pitching at least part of the seat forward and rearward, and the pitch mechanism comprises at least one pivot point at a rear of the seat portion, and a strut connecting the monopost to a front of the seat portion. The strut is configured to have its length contracted and extended, thereby providing forward pitching and rearward pitching, respectively. The freestanding vehicle seat assembly further comprises a motor for pitching the seat, the motor attached at a front of the seat portion. The pivot point also serves for comfort pivoting of the seat. The freestanding vehicle seat assembly is configured to be one of at least three seats in a vehicle. The freestanding vehicle seat assembly is an outboard seat of the at least three seats in a row, wherein another outboard seat of the at least three seats has a corresponding design as the freestanding vehicle seat assembly, and wherein an intermediate seat of the at least three seats has a narrower design than the outboard seats. The track assembly comprises at least two rails with corresponding sleds, and a load catcher configured to be mounted to a vehicle floor, and wherein the monopost further comprises a base configured to be slidingly constrained by the load catcher. The freestanding vehicle seat assembly is configured for placement in a second row of a vehicle having dual-hinged doors for the second row. The freestanding vehicle seat assembly further comprises a control module mounted on the seat, the control module configured for controlling forward-rearward pitching and fore-aft movement of the freestanding vehicle seat assembly, and also for controlling at least one function of another seat. The freestanding vehicle seat assembly comprises a seat belt assembly, wherein all mounting points for a seat belt are positioned on the freestanding vehicle seat assembly. The seat portion and the back portion are fixed relative to each other.

In a second aspect, a vehicle seat assembly includes: a seat row comprising at least three seats; an input device; and means for, in response to an input generated with the input device, providing a choreographed seat motion that comprises at least (i) moving at least two of the seats fore or aft, and (ii) pitching at least part of one or more of the seats forward or rearward.

In a third aspect, a method includes: receiving a first input in a vehicle, the vehicle having a row of freestanding seats including an outboard seat and an intermediate seat; and in response to the first input, (i) moving at least two of the seats fore or aft, including moving the outboard seat farther than the intermediate seat, and (ii) pitching at least the outboard seat forward or rearward.

Implementations can include any or all of the following features. The method further comprises, in response to the first input, determining whether the outboard seat is occupied, wherein steps (i) and (ii) are performed based on determining that the outboard seat is unoccupied. If the outboard seat is instead determined to be occupied, the method further comprises (iii) instead moving the at least two of the seats fore or aft, including moving the outboard seat farther than the intermediate seat, without pitching the outboard seat. The first input corresponds to a passenger entry or exit mode, and the method further comprises: receiving a second input that corresponds to a cargo mode; and in response to the second input, moving all the freestanding seats of the row fore and pitching all the freestanding seats forward. The vehicle has a touchscreen positioned at a front row and wherein the second input is generated using the touchscreen. Steps (i) and (ii) are performed simultaneously at least in part. The method further comprises: receiving a second input generated using an input control positioned on one of the outboard seat or the intermediate seat; and in response to the second input, moving or pitching the one of the outboard seat or the intermediate seat without moving or pitching another one of the outboard seat or the intermediate seat.

DETAILED DESCRIPTION

This document describes examples of systems and techniques for positioning seats in vehicles having more than one row of seats. Some implementations involve a vehicle with three or more seat rows, wherein seats in the second row can be repositioned to allow easy passenger entry into and exit from third-row seats. For example, to assist a third-row passenger some or all of the second-row seats can be moved fore/aft and/or pitched forward/rearward in a choreographed seat motion to allow sufficient room for ingress or egress, and this sequence can then essentially be reversed to return the seats to the previous position.

Figure 1:
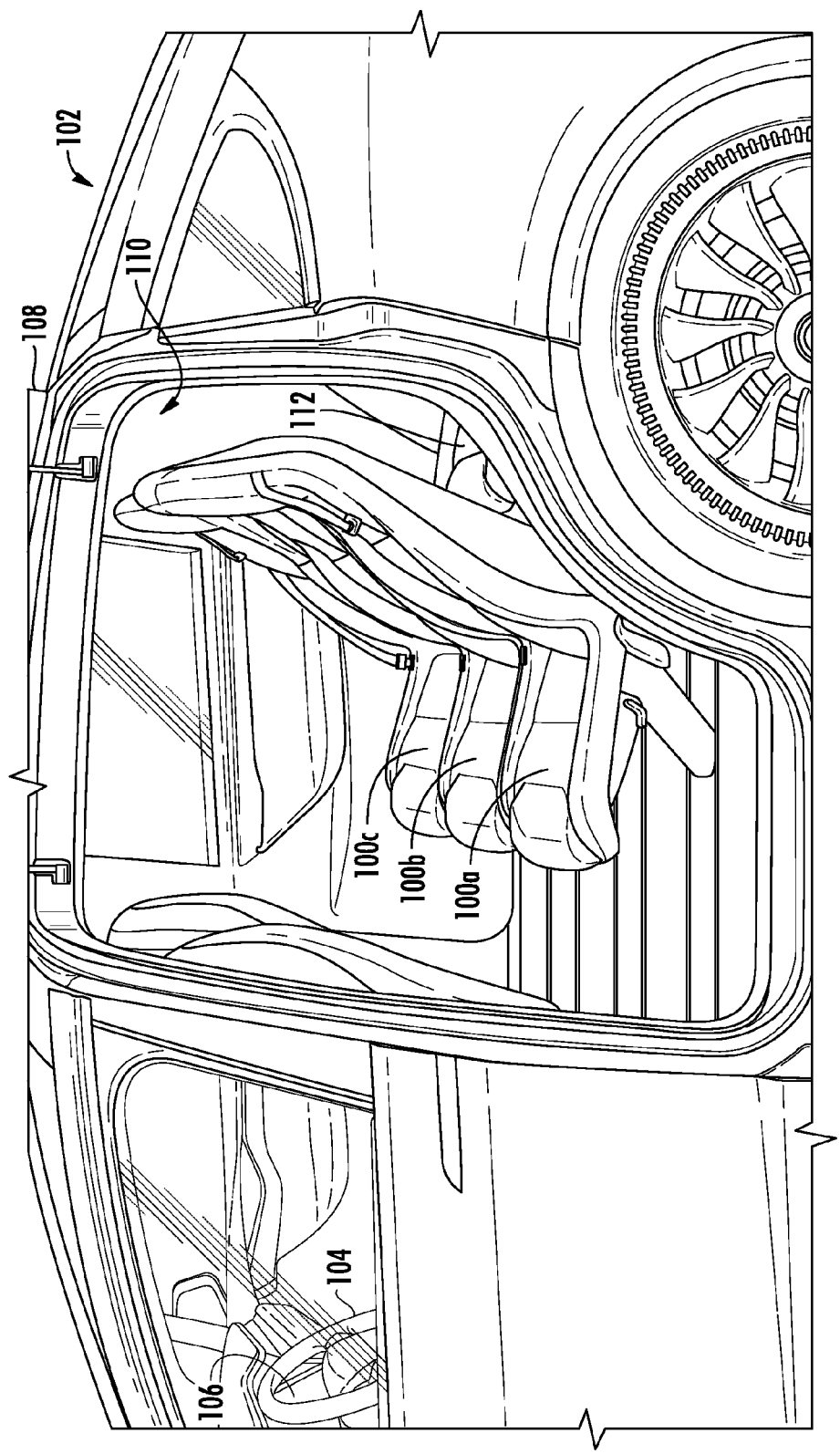
FIG. 1 shows an example of second-row seats of a vehicle in a neutral position.

FIG. 1 shows an example of second-row seats 100 of a vehicle 102 in a neutral position. In some implementations, the vehicle is a sport utility vehicle or a crossover vehicle. For example, the vehicle can be completely or partly powered by electric energy (e.g., an electric vehicle that powers a traction motor from a battery pack). As another example, the vehicle can use any of various traction techniques, including, but not limited to all-wheel drive, such as by way of separate motors for the respective front and rear axles.

The illustrated example is a left-hand drive vehicle and as such is suitable for countries or regions where vehicles drive on the right side of the road. Various controls are available to the driver and/or passengers of the vehicle, for example as described below. Here, a steering wheel 104 for the driver seat is visible, as well as a touchscreen 106 mounted on the dashboard or instrument panel. For example, the touchscreen can be essentially centered between the two front-row seats so as to not only be primarily useable by the driver, but convenient to reach for a front-row passenger as well. The touchscreen can control various vehicle settings and functions, for example seat repositioning which will be exemplified in the following.

The vehicle can have any suitable type of doors. The second-row doors can be essentially the same type as, or of a different type than, the front-row doors. Here, the second row of the vehicle has a pair of dual-hinged doors 108. In some implementations, this includes a door that has at least two separate sections hinged to each other, such as an upper door portion and a lower door portion. The upper door section can then be attached to the vehicle roof structure by hinges. For example, any or all structures described in the following U.S. patents can be used: U.S. Pat. Nos. 8,449,015; 8,511,738; 8,511,739; and/or D678,154, the contents of each of which are incorporated herein by reference.

Here, each of the dual-hinged doors 108, when open, provides a generous opening 110 for entry into and exit from the vehicle. In some implementations, when a person stands outside the vehicle with the door fully open, he or she has access to a large vertical opening in the vehicle side and also a sizeable horizontal opening in the roof (e.g., because the upper door portion is open). For example, this can allow a more convenient way of entering and exiting the vehicle, including the third-row seats.

Here, the second-row seats include an outboard seat 100A, an intermediate seat 100B and another outboard seat 100C. In some implementations, each of the seats is freestanding (i.e., attached to the vehicle only at its base) and positioned on a monopost structure as its sole support. This can allow each of the second-row seats to be moved (e.g., fore or aft) and/or pitched (e.g., forward or rearward) independently of the other seats. For example, this can allow repositioning for comfort (e.g., based on occupant preference) as well as for a utility function (e.g., to make more room inside the vehicle). Some implementations can include more or fewer seats than three in a second row or any other row.

The seats in the second row can all be of the same type or of different types. In some implementations, the respective outboard seats 100A and 100C can have essentially the same design as each other (e.g., such that they are in some sense mirror images of each other), whereas the intermediate seat(s) 100B can be of a different type. For example, an intermediate seat can have a narrower design than the outboard seats.

In this example, the second-row seats 100 are currently arranged in what can be referred to as a design position. For example, this can be considered a neutral position in which the seats have been moved aft as much as possible, so as to allow maximum legroom, and their pitch has been set to a default angle. In certain situations, one or more of the seats can be moved out of the neutral position, such as along the lines of examples described herein.

The cabin of the vehicle 102 can have some space behind the second-row seats 100 that can be used for one or more rows of seats and/or for cargo storage. Here, third-row seats 112 are shown. For example, two seats can be positioned in the third row so that the vehicle has seats for a total of seven adult occupants (two in the front row, three in the second row and two in the third row). The third-row seat(s) can be of the same type or of a different type than the seats in the second row. For example, the third-row seats can be mounted to the body of the vehicle (i.e., not completely freestanding) and/or can be of a fold-flat design (e.g., to provide cargo space). As another example, the third-row seats can have folding headrests.

The particular seats shown herein are exemplary only and different styles of seats, or seats with different features and/or functionality, can be used in some implementations. For example, one or more seats can have adjustable headrests and or at least one armrest.

Figure 2:
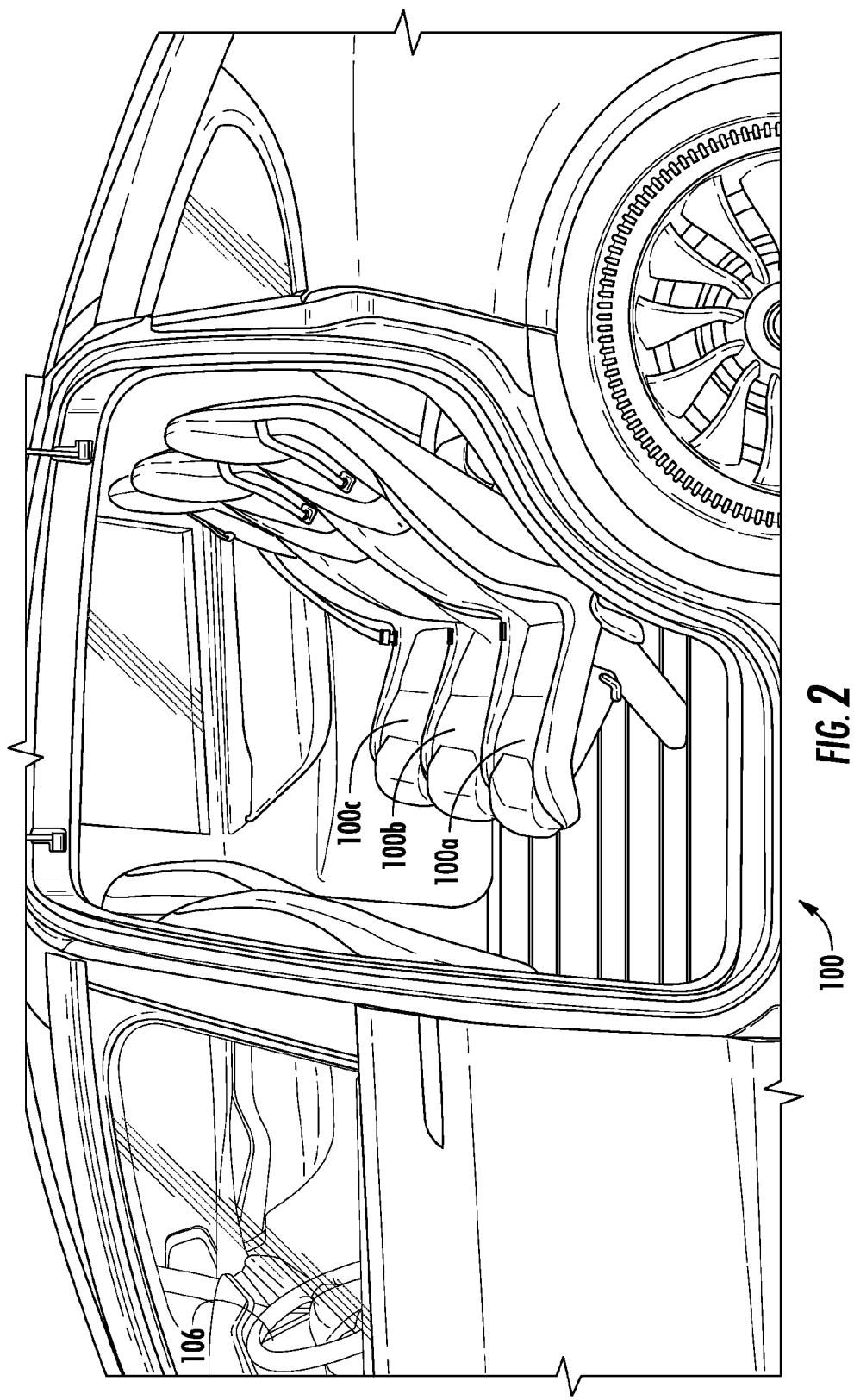
FIG. 2 shows an example where the outboard seat is pitched backward.

FIG. 2 shows an example where the outboard seat 100A is pitched backward. In some implementations, this type of pitching can be provided as a comfort setting to allow the occupant to adjust the seat according to his or her preferences. The comfort setting can allow pitching within a certain range of degrees. For example, the range can include an equal number of degrees forward and backward relative to the design position.

One or more of the second-row seats 100 can have internal adjustability, for example so that the seatback (e.g., the more upright of two seat portions) can be set at different angles relative to a seat base (e.g., where the lower seat cushion is located). In some implementations, a recliner type seatback can be used. Here, however, the second-row seats have a design where the seatback and the seat base are fixed relative to each other. That is, when such a seat is pitched forward or backward (e.g., as part of a comfort setting adjustment), the seatback and the seat base are both pivoted through the same angle of rotation. This can be accomplished using a pitch mechanism with a strut, for example powered by a motor.

The figure shows that the intermediate seat 100B and the other outboard seat 100C have currently not had their comfort settings adjusted. For example, each of them can therefore remain in a neutral or design position.

The comfort setting for seat pitch can be regulated by a passenger using a suitable input control. In some implementations, an input control for pitch is positioned at a position relatively low on the seat, such as on an outer side of the seat base. For example, such a control can be located adjacent, or be combined with, a control that regulates fore and aft seat movement (examples provided below). On an intermediate seat, the control can be located on the underside of the seat toward its front edge so that it can be reached by the passenger. As another example, a centrally located input control (e.g., on the touchscreen 106) can be used for adjusting a comfort setting.

Figure 3:
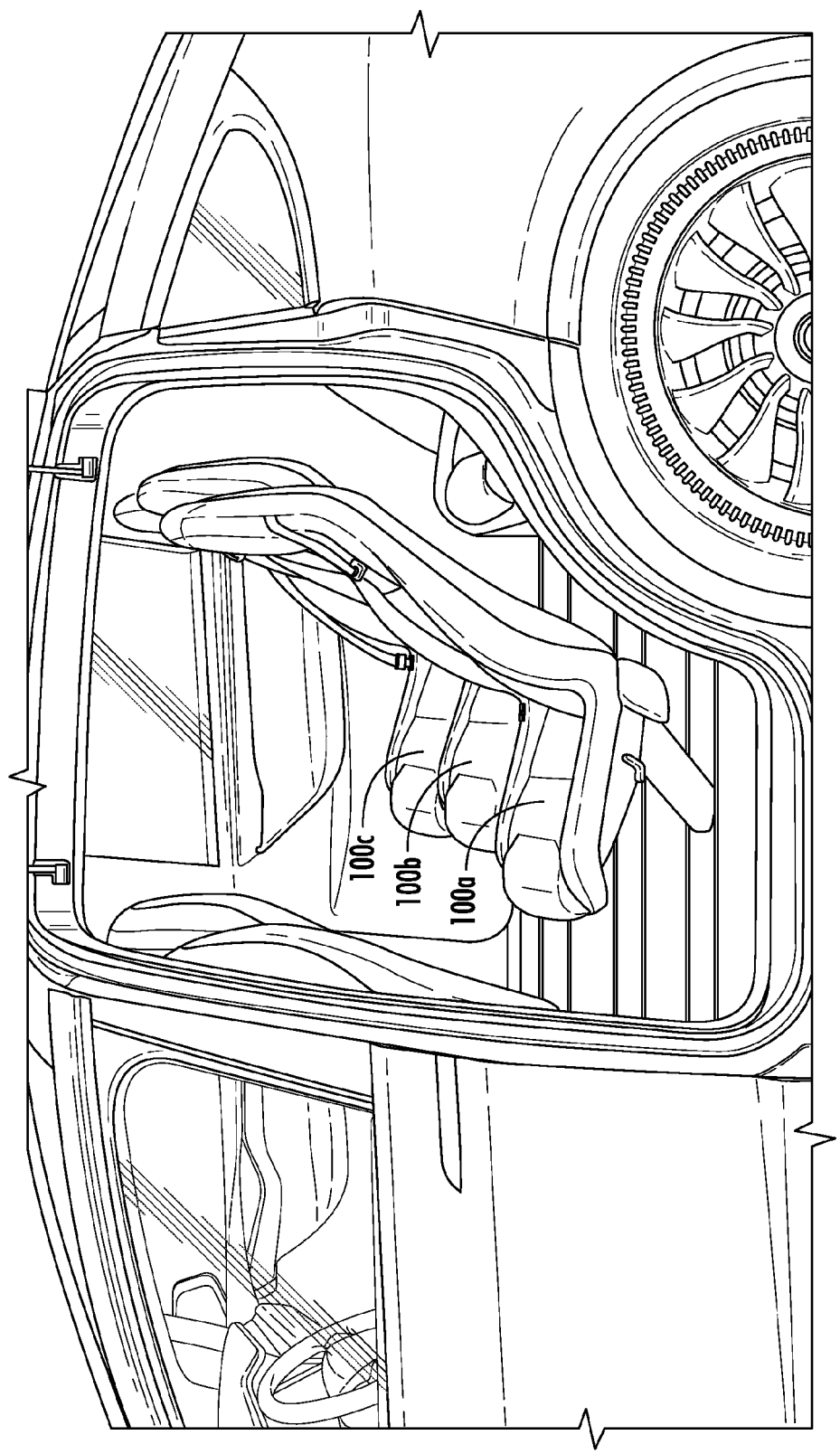
FIG. 3 shows an example where the outboard seat is moved forward.

FIG. 3 shows an example where the outboard seat 100A is moved forward. In some implementations, this relocation is done by an electric motor in the individual seat assembly that drives the freestanding seat fore or aft in the vehicle. This can be accomplished using a track assembly on which the seat structure is mounted, and such track(s) can be effectively hidden under a floorboard of the vehicle such that the movement mechanism is not readily visible to an occupant. For example, the seat structure extends up through a longitudinal slot or other opening in the floorboard that allows fore and aft movement of the seat. Such opening can be partially covered by a flexible or pliable material that gives way when the seat structure is moving.

Here, the forward movement of the seat can be considered a comfort setting, in analogy with the pitching exemplified above. The comfort setting of fore/aft movement can have a designated range of movement, such as within a specified length of the track. As another example, the comfort setting can have a specified travel speed (i.e., as controlled by the motor) that is suitable for situations when a person is sitting in the seat (although the seat may be moveable also when unoccupied).

A passenger can trigger the movement fore or aft by way of any type of input control. In some implementations, the control is located on or nearby the seat. For example, a button can be positioned on an outer side of the seat base or underneath it. On an intermediate seat, the input control can accept four separate inputs: two directions for fore/aft movement, and two directions for forward/rearward pitching. For example, a four-way rocker button can be used. As another example, a central input control such as a touchscreen can be used.

The figure shows that the intermediate seat 100B and the other outboard seat 100C have currently not been moved forward compared to the previous figure. For example, each of them can therefore remain in a neutral or design position.

The above examples have illustrated comfort setting adjustments that affect the fore/aft placement of an individual set, and/or the pitch forward/backward thereof, and it was explained that a passenger (e.g., the person sitting in that particular seat) can effectuate these readjustments using a dedicated input control. However, these may not be the only situations where a seat is moved or pitched. Rather, seat movement or pitching can also or instead be done for utility purposes, such as to provide a convenient passageway for a person entering or exiting the vehicle. Some examples are described in the following.

Figure 4:
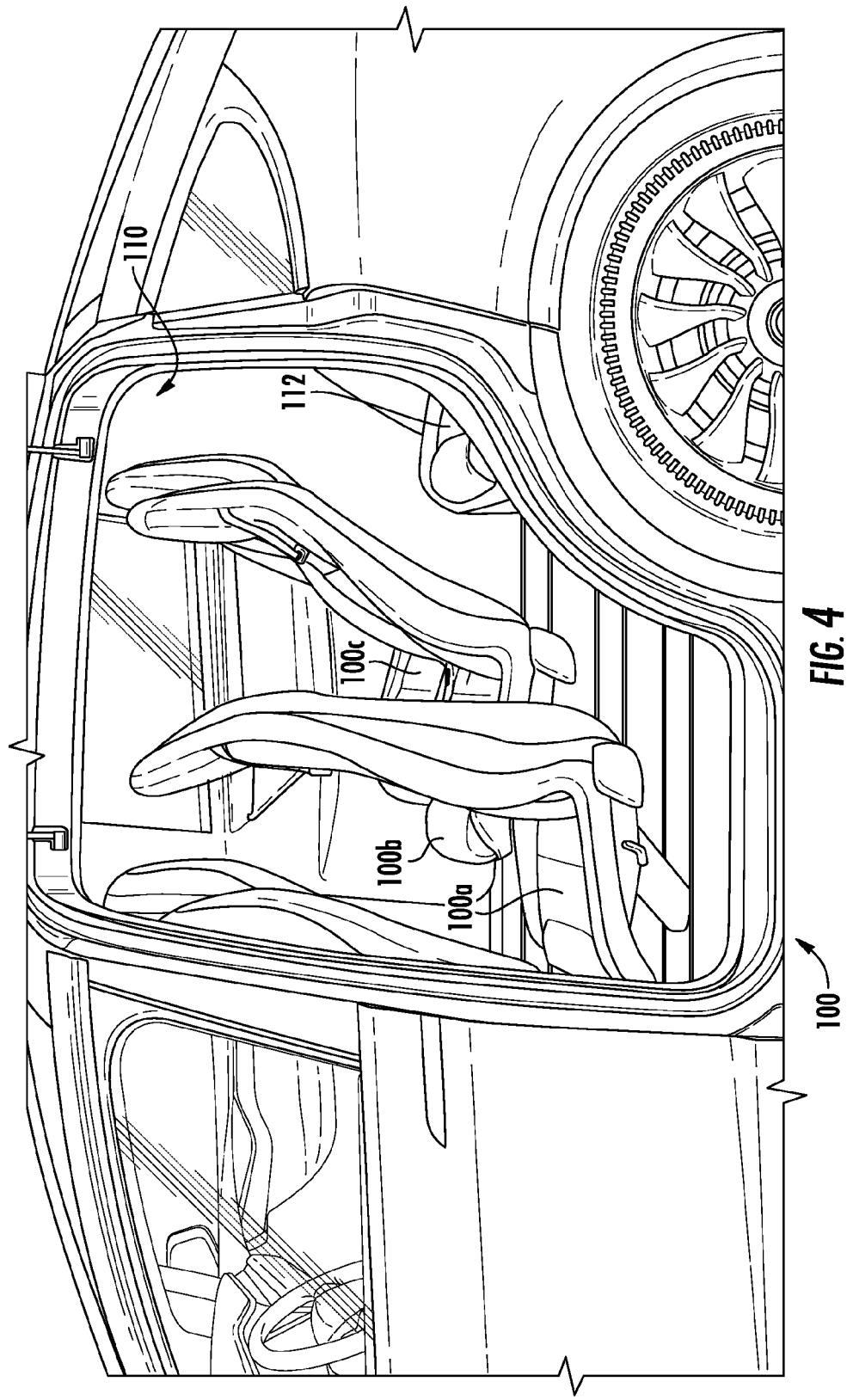
FIG. 4 shows an example where the second-row seats are in an easy entry mode.

FIG. 4 shows an example where the second-row seats 100 are in an easy entry mode. In some implementations, the vehicle also have one or more third-row seats 112. For example, one way for a passenger to enter or exit the third-row seats is through the opening 110. If the opening extends also through part of the vehicle's roof (e.g., as may be the case with a dual-hinge door) this reduces the need for the third-row passenger to crouch on the way in and out.

In this example of an easy entry mode, the outboard seat 100A has been moved fore as much as possible and has been pitched forward to a maximum extent. The fore limit can be dictated by the particular track assembly that the seat is mounted on. Similarly, the pitch mechanism on the seat (e.g., controlled by an electric motor) can set the limit of forward (and rearward) pitching. That is, this position can place the seat 100A as much as possible out of the way for the third-row passenger to enter or exit. The intermediate seat 100B, on the other hand, has also been moved forward but not as much as the outboard seat. In this example, the intermediate seat is not pitched as part of easy entry mode. The other outboard seat 100C, moreover, which is on the opposite side of the vehicle from the opening 110 that is currently open, has neither been moved nor pitched as part of this easy entry mode. Rather, the easy entry mode in this example is designated for the left side of the vehicle. In other examples, however, an easy entry mode involves movement and/or pitching of at least three seats.

In this example, the pitching forward of the seat serves to create additional space for ingress and egress. In other implementations, however, this can be accomplished without having a pitch mechanism on the seat. For example, in easy entry mode the seatback of a recliner type seat can be inclined fully forward to allow entry and exit. The frame for the seat cushion is then fixed relative to a monopost and a recliner structure is provided for the seatback. That is, in such implementations the seat cushion frame does not pivot relative to the monopost and has no strut.

The movement and/or pitching of two or more seats can be done simultaneously at least in part. For example, the vehicle can perform a choreographed seat motion in which both the outboard and intermediate seats begin moving fore at the same time (e.g., from equivalent starting points) and at the same speed. At some point, the outboard seat can begin to pitch forward. For example, if the maximum pitch forward can be accomplished in less time than the maximum fore movement, then it is sufficient to initiate the pitching once the seat has moved a certain distance. As another example, the pitching can begin only after the seat has finished moving forward, or right at the beginning of the fore motion.

In some implementations, one or more parameters for the movement in easy entry mode can be different than in other situations (e.g., when a passenger is adjusting a comfort setting). For example, the fore and aft movement can be faster than what is available for a comfort adjustment, including, but not limited to, multiple times faster. As another example, the fore and aft movement can extend over a longer distance in the vehicle than what is available for a comfort adjustment, including, but not limited to, multiple times longer. As yet another example, the pitching angle can be greater than what is available for a comfort adjustment, including, but not limited to, multiple times greater. Combinations of these parameter differences, and/or other parameter differences, can be used.

The easy entry mode can be regulated by a passenger using a suitable input control. For example, such control can allow a person to first bring the seats into easy entry mode (i.e., when the person is about to enter or exit the third row), and thereafter to return the seats to their previous (or a default) position. In some implementations, an input control for easy entry mode is located on the second-row seat so that it is conveniently accessible from both outside the vehicle and the third-row seats. For example, the control can be positioned relatively high up on the second-row seat, such as near the headrest or on the shoulder of the seat. As another example, a centrally located input control (e.g., a touchscreen) can be used for easy entry mode.

In some implementations, each of the outboard seats 100A and 100C has a respective input control for easy entry mode. This can allow passengers on either side of the vehicle to active easy entry mode for their respective sides at substantially the same time. For example, both the outboard seats can then be moved fore to the full extent, and pitched forward as much as possible. The middle seat, moreover, can also be moved forward. As such, this can allow third-row passengers convenient ingress to or egress from the vehicle on both sides thereof.

In some implementations, the easy entry mode can be modified based on whether a second-row seat is occupied. For example, assume that a person is sitting in the outboard seat 100A and that someone (whether that person or someone else) seeks to active easy entry mode for that side of the vehicle. A seat belt reminder system or other occupant sensor relating to the outboard seat can then be used to determine that the seat is occupied. Based on this determination, the easy entry mode can be modified. For example, the movement fore can then be shortened (e.g., to the maximum length available for comfort adjustments) and the pitching forward of the second-row seat can be omitted. That is, this can allow the second-row passenger to remain in his or her seat while providing an increased passageway for the third-row passenger entering or exiting the vehicle. In some implementations, the movement of the intermediate seat in easy entry mode remains the same whether that seat is occupied or not.

In some implementations, one or more of the second-row seats has an underseat light for utility and/or decorative purposes. For example, a rear facing underseat light can illuminate the floor behind the second-row seats so as to guide a passenger entering or exiting the third-row seats. As another example, a forward facing underseat light can illuminate the floor in front of the second-row seats.

Figure 5:
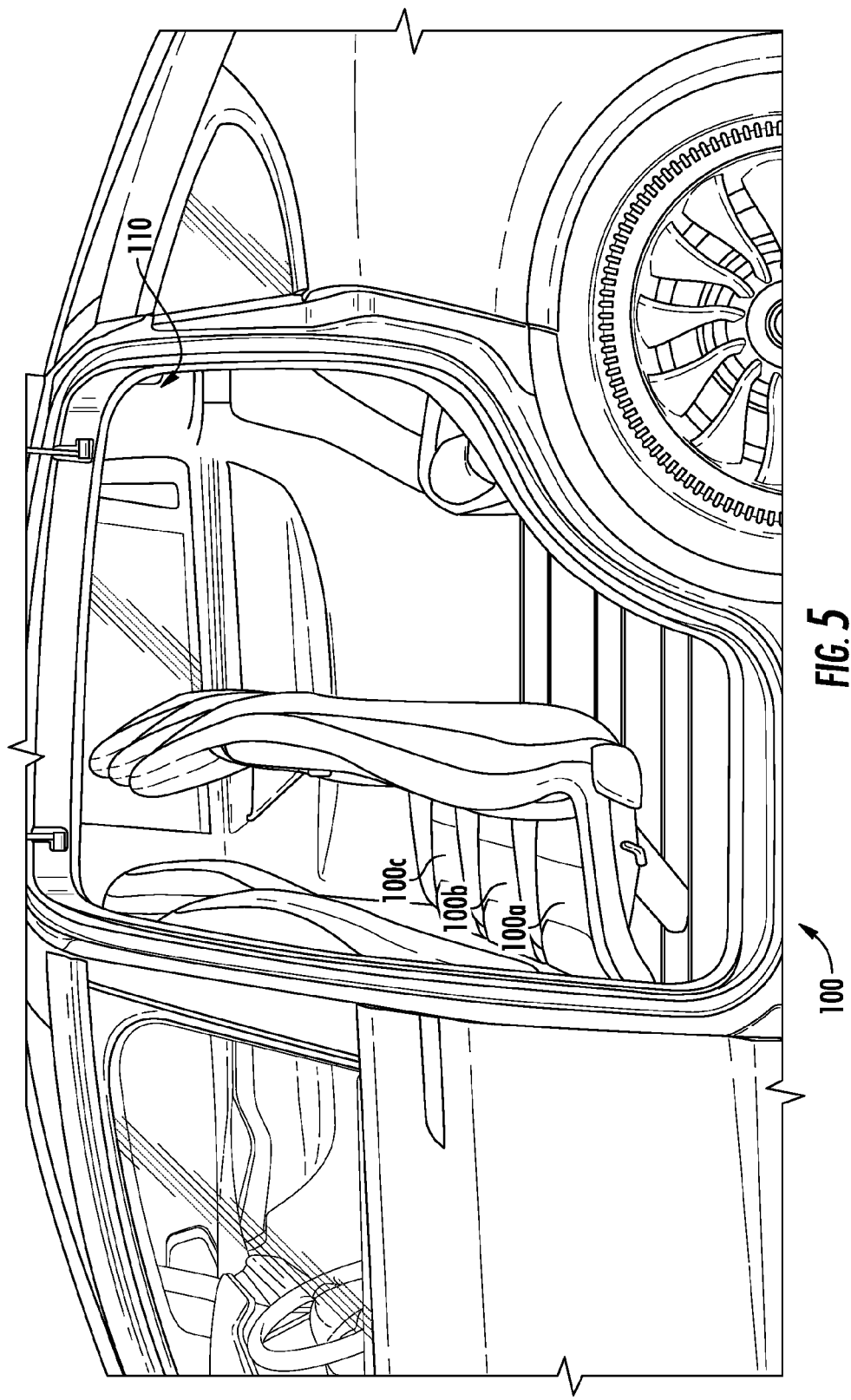
FIG. 5 shows an example where the second-row seats are in a cargo mode.

FIG. 5 shows an example where the second-row seats 100 are in a cargo mode. In some implementations, the vehicle is also suitable for transporting voluminous cargo such as large items, and this mode can therefore increase the available space and make it easier to load and unload the cargo. In this example of cargo mode, each of the seats 100A, 100B and 100C has been moved fore to the full extent, and pitched forward as much as possible. The cargo mode can be prevented (or suitably modified) if it is detected that a person is sitting in any of the second-row seats.

The cargo mode can be regulated by a passenger using a suitable input control. For example, such control can allow a person to first bring the seats into cargo mode and thereafter to return the seats to their previous (or a default) position. In some implementations, a dedicated cargo mode input control is located in the passenger cabin, such as near the opening 110 and/or near a rear vehicle opening (e.g., a liftgate). As another example, a centrally located input control (e.g., a touchscreen) can be used for easy entry mode.

Figure 6:
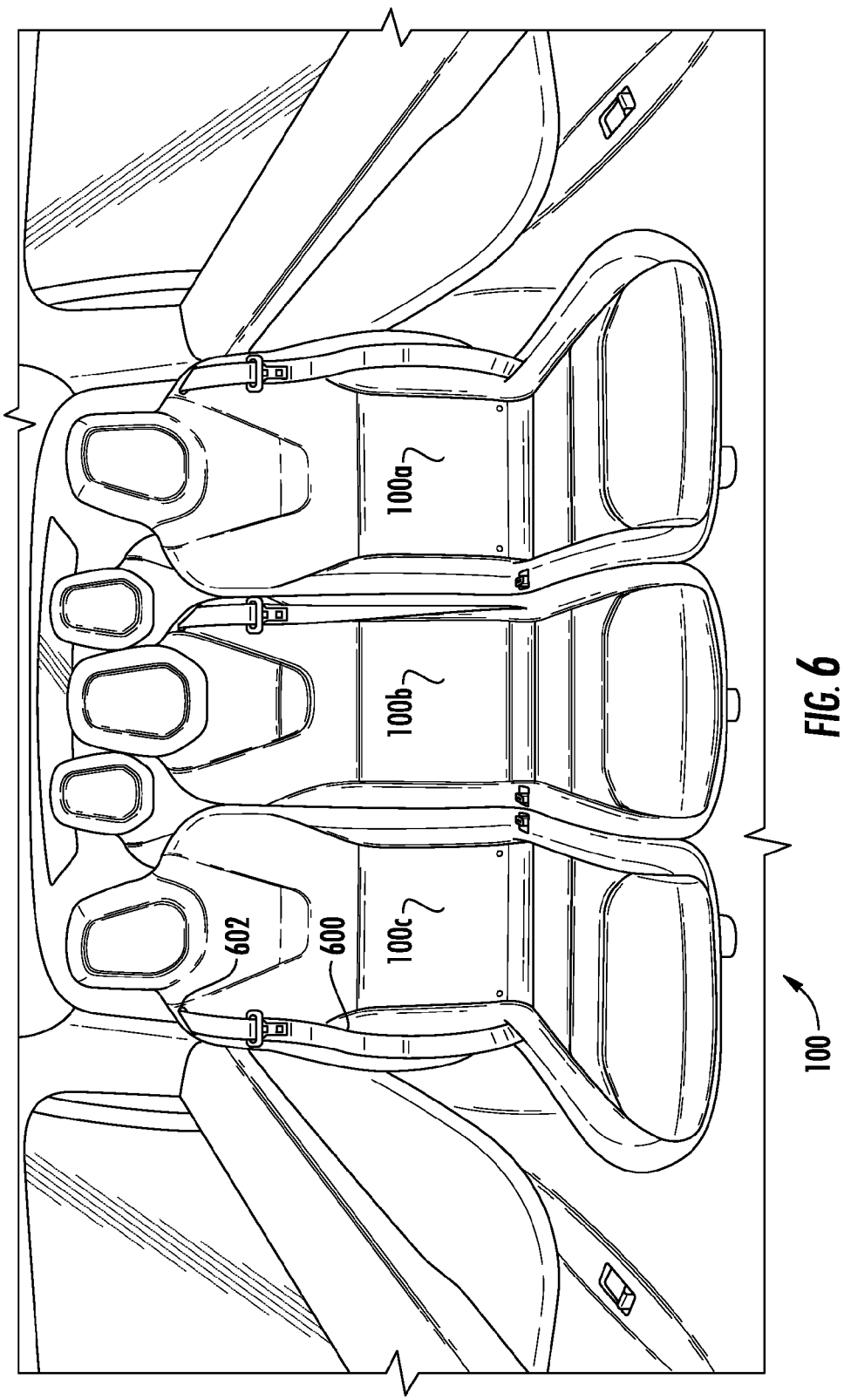
FIG. 6 shows an interior view of the second-row seats.

FIG. 6 shows an interior view of the second-row seats 100. This example illustrates that the outboard seats 100A and 100C can be of a different design (e.g., wider) than the intermediate seat(s) 100B. Here, each of the second-row seats has an integrated (e.g., fixed) headrest. The seats also have side supports for the passenger's torso to better keep the occupant in place during vehicle maneuvering.

The second-row seats have seat belts 600. Each belt is attached to the corresponding seat only; that is, not on a vehicle pillar or the floor. The belt is attached to the underlying frame structure (not shown) of the seat, and emerges from bezels or escutcheons 602. A belt buckle 604, which is also attached to the seat frame, is arranged without unnecessary protrusion from the seat cushion (e.g., to be substantially flush with the surface thereof) for an attractive appearance.

Figure 7:
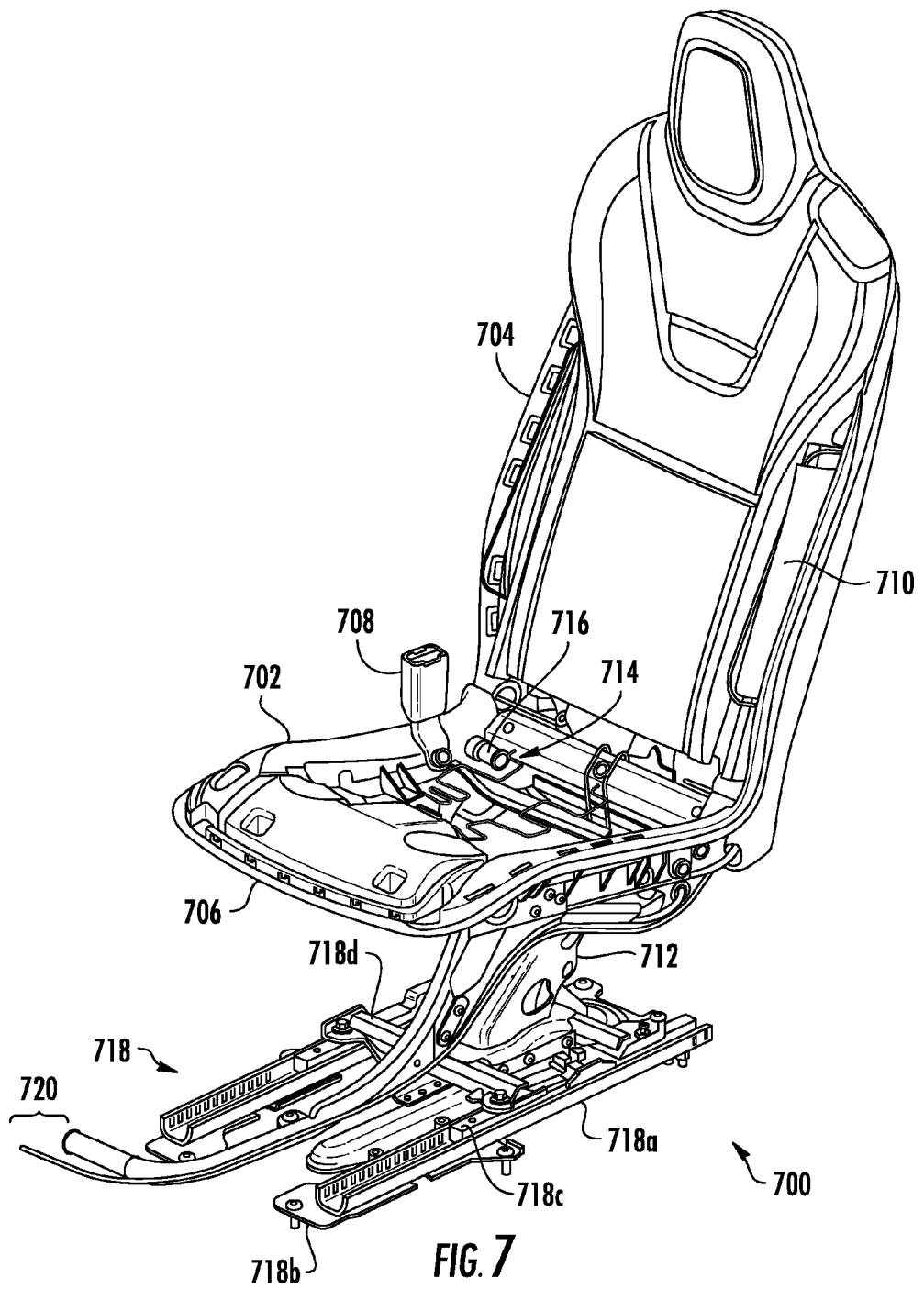
FIG. 7 shows a perspective view of an example of a freestanding seat.

FIG. 7 shows a perspective view of an example of a freestanding seat 700. The seat can be used for any example described herein, including as an outboard seat or as an intermediate seat. The seat has a seat portion 702 and a back portion 704. Each of these can be based on an underlying frame structure that is intended to be covered with panels or cushions (e.g., of plastic or foam) and ultimately with the upholstery that forms the finished outward surface of the seat. The seat is here shown in a partially assembled state to show some features that may not be visible when installed.

The seat portion 702 has a cushion support structure (e.g., of a plastic material) covering most or all of an underlying frame (e.g., of steel or another metal). A seat belt buckle 708 is attached to the frame of the seat portion. The buckle can also have a corresponding sensor (not shown) that detects whether the seat belt is buckled. The seat portion can also have one or more sensors for detecting if someone is sitting in the seat. For example, such a signal can be used for generating a seat belt reminder alert and/or to modify one or more seat movement sequences (e.g., easy entry mode). The seat portion can be provided with seat heating for passenger comfort, such as in form of a seat heater mat that also partially covers the back portion.

The back portion 704 here has a side airbag 710. That is, this airbag which is placed on a freestanding seat can complement or replace one or more other airbags such as a curtain airbag mounted on a vehicle pillar or other frame. The airbag placement will differ depending on whether an outboard seat is on the left or right side of the vehicle, whereas an intermediate seat may not have any airbag. Other components that can be located in a back portion of a seat will be exemplified later.

The seat 700—which is freestanding as opposed to, say, body mounted in the vehicle—is here supported by a monopost 712. The monopost is a structure designed to hold the seat in position during normal use and also to prevent or reduce seat dislocation in the event of an accident. For example, the monopost can be designed in a way that takes into account the possibility of impacts at certain speeds, in frontal, rear and side directions. The monopost can be manufactured as a single unitary piece or as an assembly of two or more pieces. In some implementations, respective outer halves of the monopost are formed separately and thereafter joined together by any suitable technique. As another example, one or more inner reinforcement pieces can be used.

Here, the monopost 712 forms two pivot points 714 toward the rear of the seat portion 702. The frame of the seat portion, moreover, has corresponding supports 716 configured to rest on the pivot points so that at least the seat portion can be pitched in either or both directions at its rear. For example, a round support can rest within a support of corresponding shape. In some implementations, the adjustability provided by the pivot points and the supports is used for comfort settings (e.g., an adjustment of the individual seat initiated by its occupant) as well as for utility settings (e.g., the seat is relocated or repositioned to make space inside the vehicle).

The monopost 712 is arranged onto a track assembly 718 configured for relocating the monopost and the rest of the seat 700 fore and aft in the vehicle. The track assembly can be based on tracks or rails. Here, tracks 718A are mounted fix to the vehicle by way of at least brackets 718B. In some implementations where the vehicle has an energy storage (e.g., a battery pack) mounted under vehicle floorboards, the tracks or rails can be attached to structure of the energy storage.

Riders 718C are arranged on the tracks. In some implementations, the tracks can include a toothed rack together with a corresponding gear such that the riders can travel along the track. One or more of such gears can be powered so as to drive the seat fore and aft, and to hold it in place after adjustment. As another example, a rider can be provided with a track position sensor (not shown) to generate a signal indicative of the seat's current position along the track.

The monopost 712 is here directly supported by spreaders 718D. For example, a front spreader can be positioned at the front of the track assembly and extend toward each of the two tracks. Similarly, a rear spreader extending toward each of the two tracks can be positioned at the rear of the track assembly. That is, the load of the seat (and any current occupant) is consolidated into the monopost which here has less horizontal cross section area than, say, the seat frame. Before the load is applied to the vehicle floor, moreover, the spreaders serve to spread the load out over a larger horizontal area than the monopost itself.

In some implementations, some or all of the track assembly 718 is positioned beneath the interior floor level of the passenger compartment. For example, the tracks 718A, brackets 718B, riders 718C and spreaders 718D can be positioned underneath the floor so that they are normally out of reach for passengers. The floor can have a longitudinal opening that accommodates the width of the monopost (e.g., at a relatively narrow portion thereof) such that the seat assembly can be moved fore and aft.

Connectors 720 facilitate power supply to the seat as well as transmission of various control signals. In some implementations, the seat is powered using a low-voltage circuit in the vehicle (e.g., 12V). For example, in an electric vehicle this circuit can be independent of the electric power used for the traction motor. A controller area network (CAN) in the vehicle can be extended to and from the seat for control purposes. One or more safety functions can be implemented using signals through the connectors, including, but not limited to, detection of seat occupant and/or whether the seat belt is buckled. As another example, the seat 700 can also serve as the control for a separate seat and signals and/or power for that seat can therefore be routed to and from the seta 700 as well. The connectors 720 can be drawn individually or in form of a dedicated harness, to name just two examples.

Figure 8:
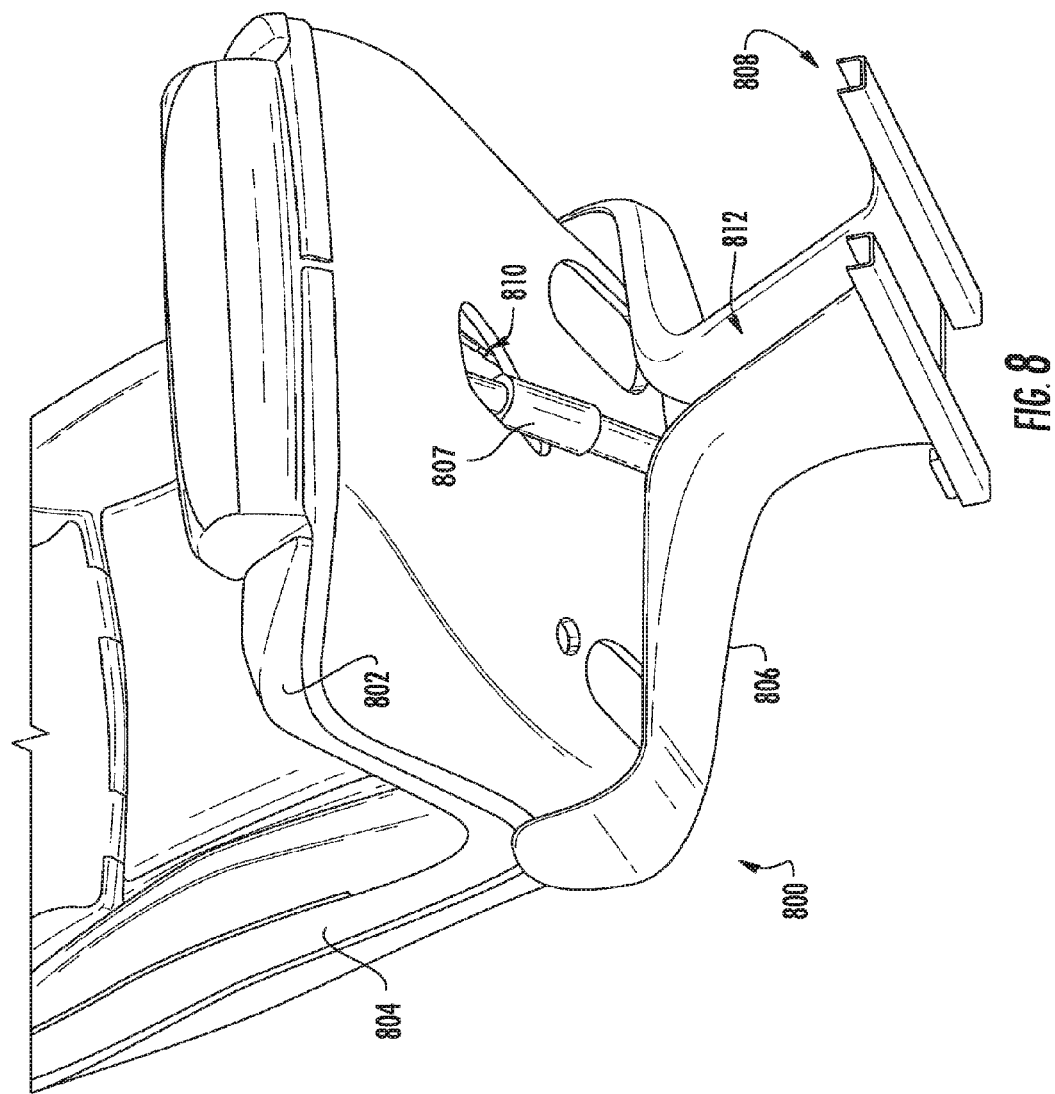
FIG. 8 shows another perspective view of an example of a freestanding seat.

FIG. 8 shows another perspective view of an example of a freestanding seat 800. The seat has a seat portion 802 and a back portion 804 connected to each other. The seat portion is pivotally mounted on a monopost 806 which in turn rests on a track assembly 808. Items on the seat 800 that are not explicitly mentioned here can be similar or identical to those of the seat in FIG. 7.

Pitching of the seat portion 802 (and optionally also of the back portion 804) forward and backward can be accomplished using at least one strut 807. In some implementations, such pitching is used for comfort settings as well as for utility settings. The strut has one end pivotally connected to the monopost whereas the other end is pivotally connected toward the front of the set portion 802. In some implementations, the strut is configured to be selectively extended or contracted so as to assume different lengths. This in turn serves to raise or lower the front of the seat portion, thereby pitching the seat about the pivot point(s) between the seat portion and the monopost. For example, an electric moto positioned inside the seat portion can expand and contract the strut based on control signals.

The seat portion 802 here has an opening 810 that accommodates the expanding or contracting strut 808. Also, in some implementations, the monopost 806 has a decorative cover (not shown) placed over its front 812, the decorative cover having an opening that accommodates the strut in the various positions it assumes (due to the expansion or contraction thereof). For example, the decorative cover is designed to have a predefined clearance to the strut when the strut is in its lowest position. That is, the opening 810 and/or the decorative cover can reduce or eliminate visibility to a passenger of the strut and associated components during normal use.

Arrangements other than an expandable/contractible strut can be used for pitching the seat. For example, the seat portion 802 can be connected to a link (not shown) that is also connected to the monopost in a way that the link is lowered to pivot the seat forward or raised to pivot the seat backward. Such link can be controlled by a latch in the seat. For example, latch release can be controlled by a latch actuator (not shown), and a pitch latch sensor (not shown) can indicate the current state of the latch.

Figure 9:
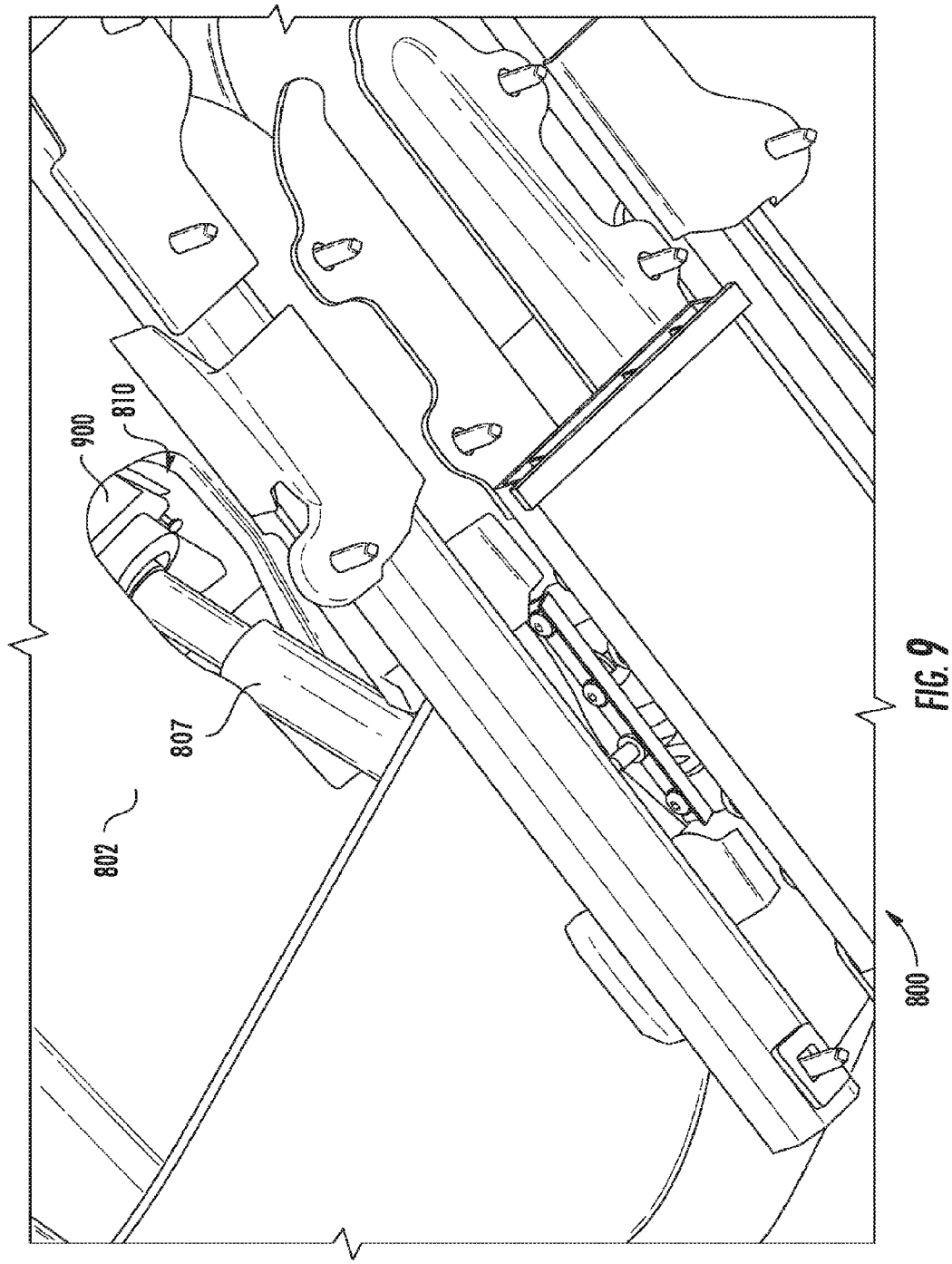
FIG. 9 shows another view of the freestanding seat in FIG. 8.

FIG. 9 shows another view of the freestanding seat 800 in FIG. 8. That is, the strut is here seen extending into the opening 810 of the seat portion 802. Inside the seat portion an electric motor 900 is positioned. The motor and/or the strut are hinged (e.g., pivotally mounted) at the front of the seat portion so as to accommodate pitching of the seat. In some implementations, the strut can be attached to the motor which is in turn pivotally connected to the frame of the seat portion. For example, the motor can include a lead screw serving to expand or contract the length of the strut.

Figure 10:
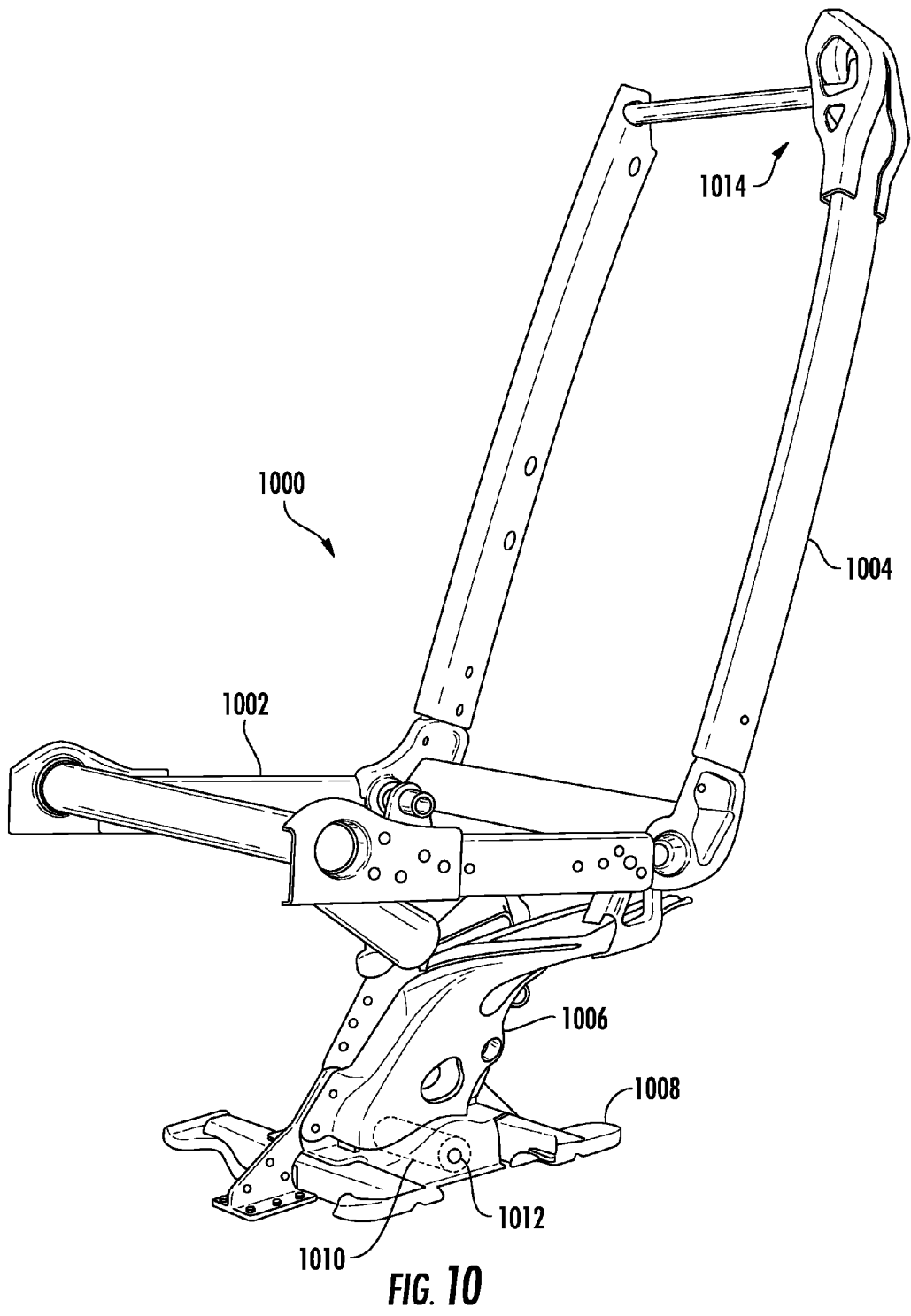
FIG. 10 shows an example of a frame structure for a freestanding seat.

FIG. 10 shows an example of a frame structure 1000 for a freestanding seat. The structure includes a seat frame 1002, a back frame 1004, a monopost 1008 and a spreader frame 1008. In general terms, the spreader frame can serve to spread (i.e., broaden horizontally) the load from the seat above after it was brought down through the single structural post formed by the monopost. For example, some frame components are made of closed tubular sections, which can add torsional stiffness and packaging efficiency.

The monopost can be subjected to significant loads, especially when the seat is occupied and the vehicle experiences strong forces, such as during a collision. Part or all of the monopost can therefore be made of material(s) having significant yield and/or tensile strength, including, but not limited to, ultra high strength steel. For example, the material selection can be made based on the resulting mass of the component, on its formability, and the optimization of joining techniques (e.g., welding). Also, or instead, the monopost can have reinforcement structures inside it that add to its structural integrity.

A motor 1010 is positioned inside the monopost and is here illustrated in phantom. The motor actuates a drive shaft 1012 so as to move the seat fore and aft relative to a track assembly (e.g., in FIG. 7). For example, the drive shaft can extend outside the monopost on both sides thereof. An electric motor of suitable capacity can be used.

The frame structure 1000 provides anchor points for a seat belt mounted on the seat. That is, the seat belt can be contained entirely on the seat so that the seat belt is not affected by fore/aft movement or pitching of the seat. Here, an upper anchor point is provided by a bracket 1014 on the back frame 1004. In some implementations, the bracket has a clamshell design in which two separate components are attached (e.g., welded) together to form the anchor point. Other seat belt anchor points can be provided on the seat frame 1002.

Figure 11:
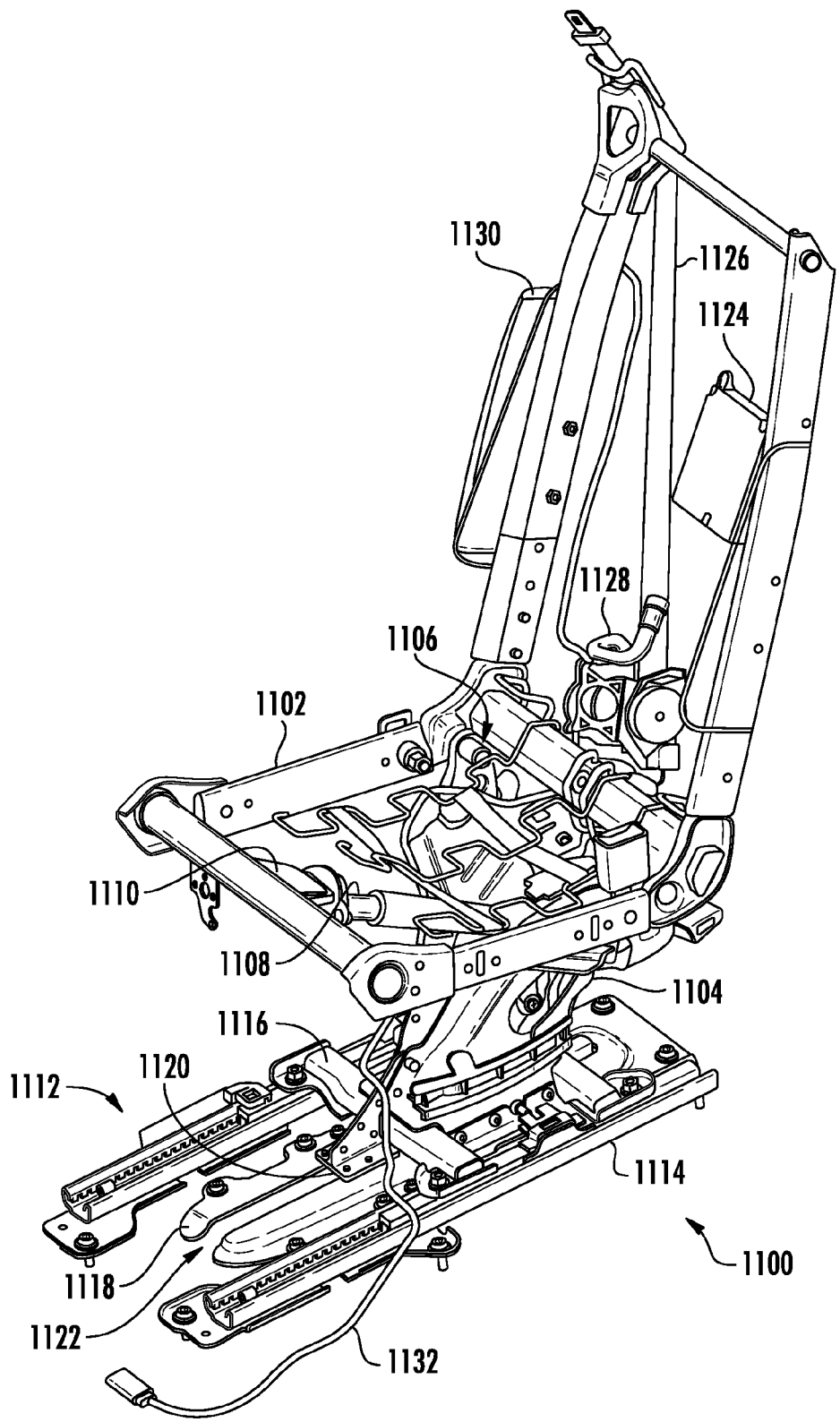
FIG. 11 shows another example of a frame structure for a freestanding seat.

FIG. 11 shows another example of a frame structure 1100 for a freestanding seat. At a high level, the frame structure 1000 illustrates that a seat frame 1102 can be pivotally mounted on top of a monopost 1104 by way of pivot points 1106 and a strut 1108 driven by a motor 1110. Components that are not specifically described can be the same as or similar to those of other examples herein (e.g., FIG. 7).

A track assembly 1112 provides fore/aft movability of the seat relative to tracks 1114 (e.g., C-tracks). The load coming down through the monopost is again spread over a larger area using spreaders 1116. In addition to the tracks, one or more load catchers 1118 are also fixedly attached to the vehicle floor structure. Here, the monopost at its bottom has a base structure 1120 that partially extends below the load catcher which also has a longitudinal opening 1122. By this arrangement, the base—and thereby the monopost—is slidingly engaged with the load catcher and can therefore travel fore and aft relative to it, but upward, downward and/or sideways loads on the monopost are restrained by the load catcher and released into the overall vehicle structure.

A control module 1124 regulates operation of the seat and optionally of one or more other seats. The control module is based on a processor executing instructions and can therefore be implemented using a combination of hardware, firmware and software. For example, the control module controls how one or more seats are moved (e.g., for comfort and utility settings) and reports various sensor outputs to other components of the vehicle.

The seat has a seat belt 1126, which is here shown only at the rear of the back frame portion for clarity. The seat belt extends from a retractor pretensioner 1128 at the bottom of the back portion up to a seat belt anchor point at the top of the frame. For example, at the upper anchor point a metal wire can be used in anchoring the seat belt. When implemented, the seat belt would emerge at the top anchor point and be available for placement across a passenger's torso.

A side air bag 1130 is mounted on the seat frame of this freestanding seat. The airbag is controlled using a bus 1132 that can be joined with other cables in a common harness (not shown). In this example, the upper anchor point and the side air bag are both located to the passenger's right when seated, so that the seat is suitable to be an outboard seat on the right side of the vehicle.

Figure 12:
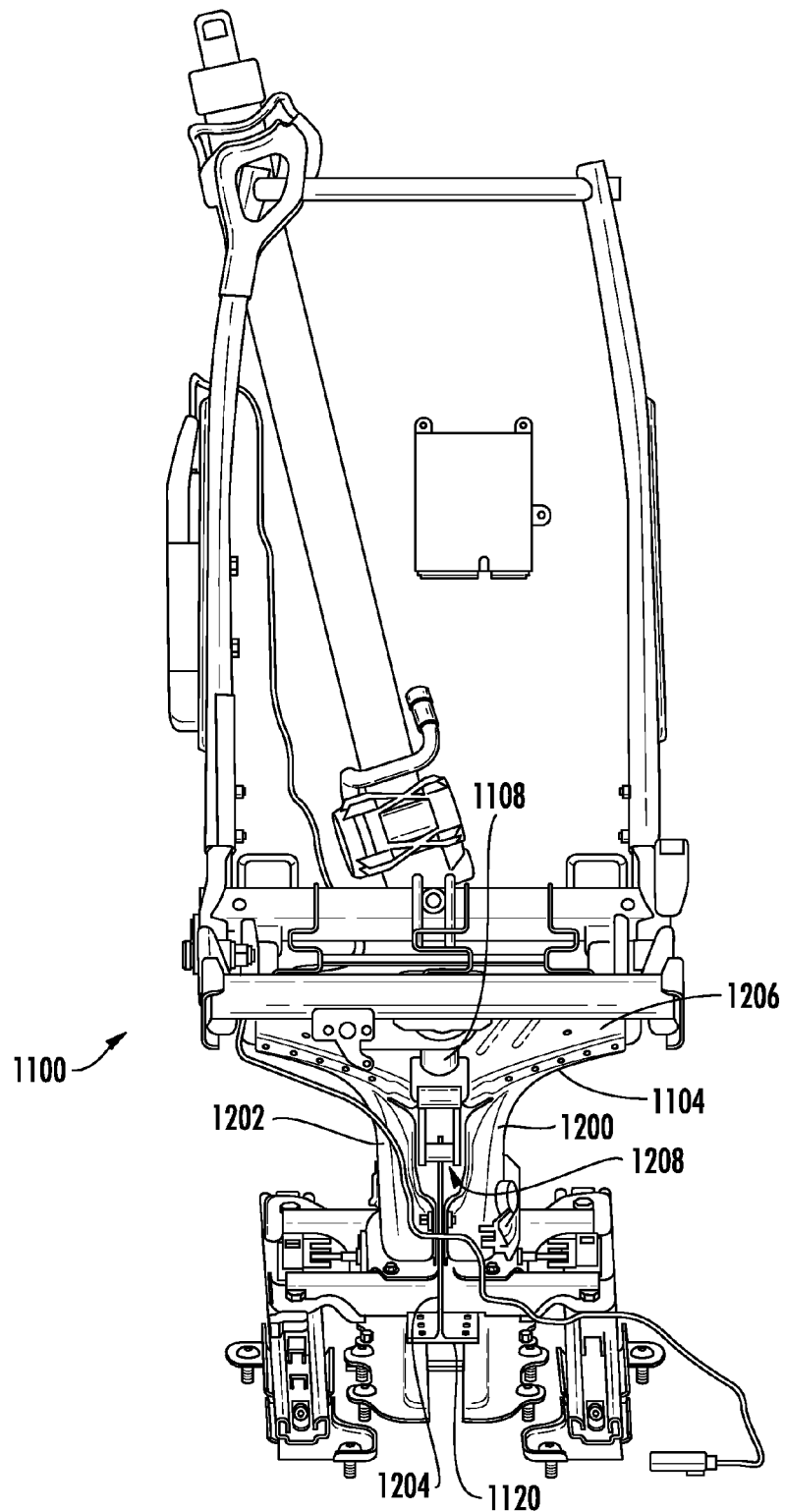
FIG. 12 shows another view of the frame structure in FIG. 11.

FIG. 12 shows another view of the frame structure 1100 in FIG. 11. Here, the monopost 1104 includes respective body members 1200 and 1202, between which a flat support member 1204 is held. The member 1204 extends down and forms the base structure 1120. An upper monopost member 1206 is attached to both the body members 1200 and 1202 at their upper parts and can further serve to support the seat frame. The body members 1200 and 1202 form an opening 1208 toward the front of the seat, which opening accommodates movement of the strut 1108 and can provide structural integrity to the monopost.

Figure 13:
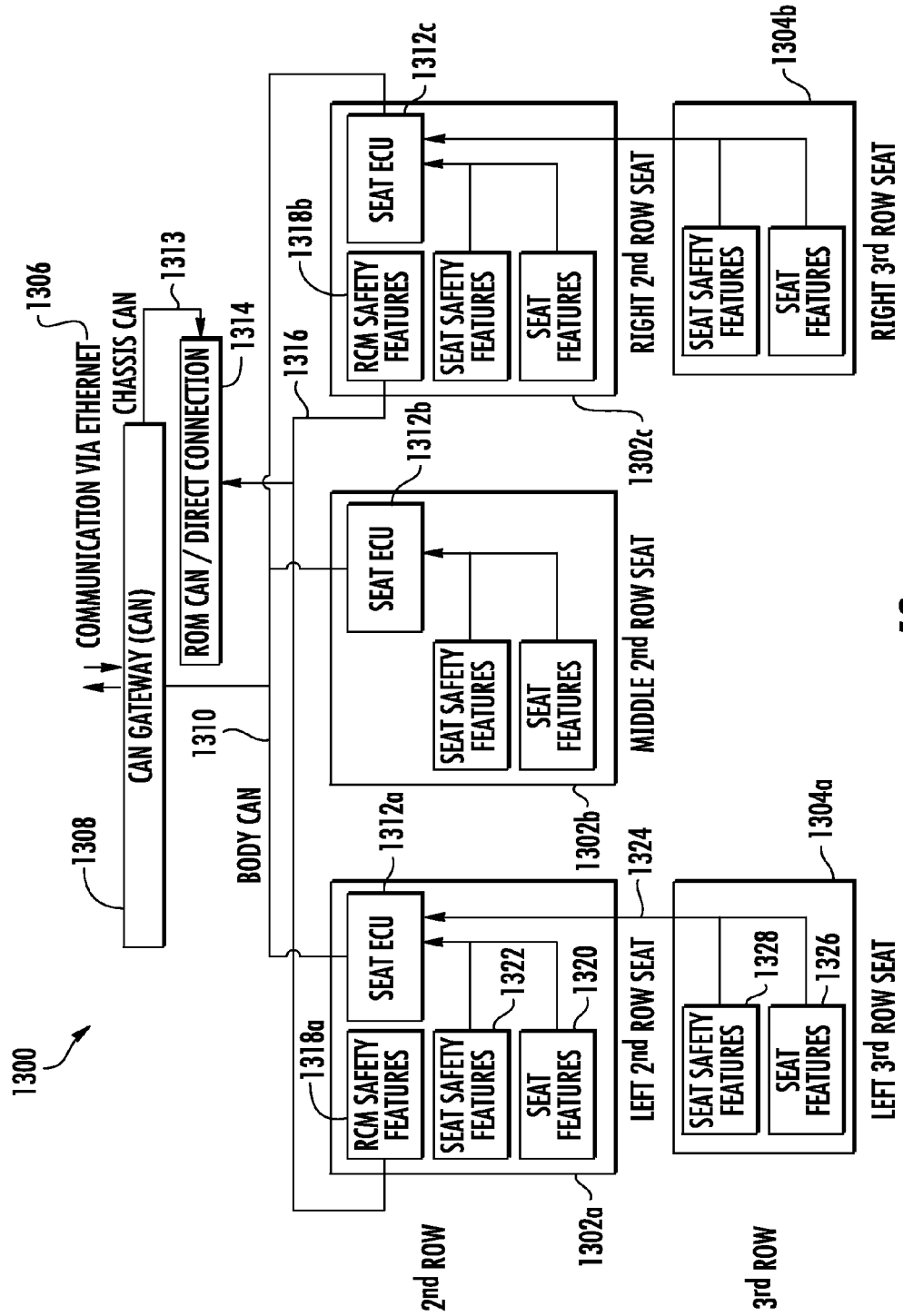
FIG. 13 shows an example architecture for a seat system.

FIG. 13 shows an example architecture 1300 for a seat system. The seat system here includes three second-row seats 1302A-C and two third-row seats 1304A-B. Other implementations can have other numbers, or arrangements, of seats.

Here, the vehicle is equipped for communication via Ethernet 1306 and for this purpose has a CAN gateway module 1308. For example, the module represents a node that interfaces between the communication protocols of (here) the Ethernet and the communication protocol(s) of a body CAN 1310.

The body CAN 1310 connects the CAN gateway module 1308 to each of respective seat electronic control modules (ECUs) 1312A-C. Here, the ECUs 1312A-C are positioned in the respective second-row seats. CAN communication may also extend to other components of the vehicle and be used for other purposes than seat control. For example, the vehicle here also has a chassis CAN 1312 that in part serves to connect the CAN gateway module 1308 to a module 1314 for direct connections 1316. That is, the direct connections in this example are separate from the body CAN 1310 and in particular extend to respective restraint control modules (RCMs) 1318A-B. In this example, the outboard seats 1302A and 1302C have respective RCMs. The RCMs control one or more safety features, including, but not limited to, air bags or pretensioners for seat belts.

The seat ECU controls various features for one or more seats. Here, for example, the ECU 1312A controls the following for the second-row seat 1302A: seat features 1320 (e.g., seat movements controlled by a seat occupant or other passenger) and seat safety features 1322 (e.g., a buckle sensor, a seat (track) position sensor, or an occupancy sensor for seat belt reminders). As indicated by a direct connection 1324, the ECU 1312A also controls various features of the third-row seat 1304A. For example, seat features 1326 and/or seat safety features 1328 of the third-row seat can be controlled. A similar arrangement can be made between the other outboard seat 1302C and its respective third-row seat 1304B.

A number of implementations have been described as examples. Nevertheless, other implementations are covered by the following claims.

What is claimed is:

1. A freestanding vehicle seat assembly comprising:
    a seat having a seat portion connected to a back portion;
    a monopost having a base, the monopost attached at a bottom of the seat portion;
    a track assembly attached at a bottom of the monopost, the track assembly including:
        a plurality of sleds;
        a plurality of rails;
        brackets for attaching the plurality of rails to a vehicle structure;
        and one or more load catchers;
    wherein the monopost is further attached to the plurality of sleds;
    wherein the plurality of sleds are arranged on the plurality of rails;
    wherein the base extends below and slidingly engages with the one or more load catchers to allow for fore and aft movement of the freestanding vehicle seat assembly.

2. The freestanding vehicle seat assembly of claim 1, further comprising a pitch mechanism on the monopost configured for pitching at least part of the seat forward and rearward, wherein the pitch mechanism comprises at least one pivot point at a rear of the seat portion, and a strut connecting the monopost to a front of the seat portion.

3. The freestanding vehicle seat assembly of claim 2, wherein the strut is configured to have its length contracted and extended, thereby providing forward pitching and rearward pitching, respectively.

4. The freestanding vehicle seat assembly of claim 2, further comprising a motor for pitching the seat, the motor attached at the front of the seat portion.

5. The freestanding vehicle seat assembly of claim 2, wherein the pivot point also serves for comfort pivoting of the seat.

6. The freestanding vehicle seat assembly of claim 1, configured to be one of at least three seats in a vehicle.

7. The freestanding vehicle seat assembly of claim 6, wherein the freestanding vehicle seat assembly is an outboard seat of the at least three seats in a row, wherein another outboard seat of the at least three seats has a corresponding design as the freestanding vehicle seat assembly, and wherein an intermediate seat of the at least three seats has a narrower design than the outboard seats.

8. The freestanding vehicle seat assembly of claim 1, configured for placement in a second row of a vehicle having dual-hinged doors for the second row.

9. The freestanding vehicle seat assembly of claim 1, further comprising a control module mounted on the seat, the control module configured for controlling forward-rearward pitching and fore-aft movement of the freestanding vehicle seat assembly, and also for controlling at least one function of another seat.

10. The freestanding vehicle seat assembly of claim 1, further comprising a seat belt assembly, wherein all mounting points for a seat belt are positioned on the freestanding vehicle seat assembly.

11. The freestanding vehicle seat assembly of claim 1, wherein the seat portion and the back portion are fixed relative to each other.

12. The freestanding vehicle seat assembly of claim 1, wherein the track assembly further includes a plurality of gears, and the plurality of rails include a toothed rack.

13. The freestanding vehicle seat assembly of claim 1, wherein the monopost is attached to the plurality of sleds via a plurality of spreaders.

14. The freestanding vehicle seat assembly of claim 1, wherein the plurality of spreaders include a front spreader and a rear spreader.

15. The freestanding vehicle seat assembly of claim 1, wherein the monopost is attached to the plurality of sleds via a spreader frame.

16. The freestanding vehicle seat assembly of claim 1, wherein the monopost includes:
   a first body member;
   second body member; and
   a flat support member which extends down and forms the base;
   wherein the flat support member is held between the first body member and the second body member.

* * * * *